US006084028A

United States Patent [19]
Someda et al.

[11] Patent Number: 6,084,028

[45] Date of Patent: Jul. 4, 2000

[54] NITRILE RESIN COMPOSITION

[75] Inventors: Makoto Someda; Masahiro Kaneko; Mitsuo Kawata; Kyoji Kuroda; Hiroaki Narisawa; Shinichi Asai, all of Aichi, Japan

[73] Assignee: Mitsui Chemicals, Inc., Japan

[21] Appl. No.: 09/152,518

[22] Filed: Sep. 14, 1998

[51] Int. Cl.$^7$ ........................ C08G 63/40; C08G 63/685; C08G 69/44

[52] U.S. Cl. ................................. 525/66; 525/69; 525/68

[58] Field of Search .................................. 525/66, 68, 69

[56] References Cited

U.S. PATENT DOCUMENTS

| | | | |
|---|---|---|---|
| 4,302,558 | 11/1981 | Ohya et al. . | |
| 4,384,078 | 5/1983 | Ohya et al. . | |
| 4,859,727 | 8/1989 | Sasaki et al. . | |
| 5,338,795 | 8/1994 | Fukumoto et al. . | |
| 5,500,478 | 3/1996 | Fukumoto et al. . | |
| 5,604,284 | 2/1997 | Ueda et al. . | |
| 5,652,326 | 7/1997 | Ueda et al. ............................. | 528/288 |

FOREIGN PATENT DOCUMENTS

| | | |
|---|---|---|
| 0242158 | 10/1987 | European Pat. Off. . |
| 303489 | 2/1989 | European Pat. Off. . |
| 0352624 | 1/1990 | European Pat. Off. . |
| 0468462 | 1/1992 | European Pat. Off. . |
| 4235505 | 4/1994 | Germany . |
| 63-309552 | 12/1988 | Japan . |
| 6-100747 | 4/1994 | Japan . |
| 7-025975 | 3/1995 | Japan . |
| 8-253640 | 10/1996 | Japan . |

OTHER PUBLICATIONS

Patent Abstracts of Japan, vol. 013, No. 236 (C–602), May 30, 1989 & JP 01045429 A (Toray Ind. Inc.), Feb. 17, 1989 *abstract*.

*Primary Examiner*—Jeffrey C. Mullis
*Attorney, Agent, or Firm*—Burns, Doane, Swecker & Mathis, L.L.P.

[57] ABSTRACT

A nitrile resin composition having excellent transparency, antistatic properties and practical physical properties. The composition comprises (A) 80 to 97 wt. % of a nitrile resin which is obtained by graft copolymerization, in the presence of 3 to 30 parts by weight of a rubbery polymer containing at least 50 wt. % of a conjugated diene unit, of 100 parts by weight of a monomer mixture containing an unsaturated nitrile and an alkyl methacrylate, and has, as a matrix component, 65 to 80 wt. % of an unsaturated nitrile unit and 20 to 35 wt. % in total of an alkyl (meth)acrylate unit and a unit of a further monomer copolymerizable with the unsaturated nitrile and alkyl (meth)acrylate; and (B) 3 to 20 wt. % of a polyether ester amide, wherein the ratio of the melt viscosity of the component (A) to that of the component (B) at 210° C. is 0.5 to 5 at a shear rate of $10^2$ $sec^{-1}$ and 0.5 to 3 at a shear rate of $10^3$ $sec^{-1}$ and the difference of the refractive index between the matrix component (A) to the component (B) is 0.2 or less.

29 Claims, No Drawings

NITRILE RESIN COMPOSITION

BACKGROUND OF THE INVENTION

1. Field of the Invention

This invention relates to a nitrile resin composition. More specifically, the present invention pertains to a nitrile resin composition which has excellent transparency, antistatic property and practical physical properties and is suitably used as a material which can prevent the buildup of static electricity in various parts of electronics products, household electric appliances and office automation apparatuses, and various cases of semiconductor-wafer-related products, IC-related products, and mask/reticule-related products, liquid-crystal-display-related products.

2. Description of the Related Art

General-purpose resins such as styrene resin and acrylic resin are frequently used in household electric appliances and office automation apparatuses because of their excellent transparency and rigidity. These resins are however accompanied with the problems that since they have a large surface resistivity and easily build up static electricity by friction, contact or the like, they adsorb dust, which not only impairs the appearance but also presumably causes electrostatic breakdown of IC or the like.

With a view to imparting such a resin with antistatic properties, it is the common practice to knead in it a low-molecular-weight surfactant as an antistatic agent or apply such a surfactant on the surface of a formed or molded product, thereby lowering the surface resistivity. When the antistatic agent is kneaded in a resin, however, its antistatic effects last only while it exists on the surface of the molded or formed product, but tends to be removed easily from the surface by washing or wiping with a cloth or the like, which makes it difficult to impart the surface with long-lasting antistatic properties.

In addition, in order to impart the surface with a predetermined degree of antistatic properties, a comparatively large amount of the antistatic agent should be kneaded or applied, which becomes a cause for making the surface of the molded or formed product sticky.

As a process which can overcome the above-described problems and impart the surface with long-lasting antistatic properties, proposed are a method (in Japanese Patent Application Laid-Open Nos. SHO 55-36237 and SHO 63-63739) of adding, to an acrylic resin, a vinyl copolymer having a polyethylene chain with a sulfonate group, carboxylate group or a quaternary ammonium salt group introduced therein; and a resin composition (in Japanese Patent Application Laid-Open No. SHO 62-241945) of a specific polyether ester amide elastomer, graft copolymer and a modified vinyl polymer containing a carboxyl group. These methods use the polymers which are not easily commercially available so that the production cost becomes high. The former method of adding the above-described the copolymer to an acrylic resin has the problem of impairing transparency and heat resistance which are characteristics of the acrylic resin.

In Japanese Patent Application Laid-Open No. HEI 8-253640, a resin composition comprising a polyether ester amide and a thermoplastic resin such as styrene resin is disclosed. Since this resin composition contains as main components a styrene resin and alkyl (meth)acrylate resin, it is inferior in mechanical properties, particularly impact resistance. Although having improved antistatic properties, the molded or formed product from the resin composition is presumed to have poor appearance due to a peeling phenomenon, because no limitation is imposed on the molecular weight and melt viscosity of the resin and melt viscosity of the polyether ester amide. Therefore, the above-described resin composition is not always satisfactory.

Nitrile resins are excellent in transparency, mechanical properties and dustproofness. They are therefore used frequently as a material for a carrier of electronic parts, however, their antistatic properties are not sufficient. There is accordingly a demand for the development of a material which is transparent and has excellent antistatic properties.

An object of the present invention is to provide a resin composition of polyether-ester-amide and nitrile resin having excellent transparency, antistatic properties and practical physical properties.

SUMMARY OF THE INVENTION

The present inventors have carried out an extensive investigation. As a result, it has been found that a resin composition obtained by adding a polyether ester amide having a specific melt viscosity and refractive index to a nitrile resin prepared by the graft copolymerization, in the presence of a rubbery polymer of a monomer mixture containing an unsaturated nitrile monomer, an alkyl (meth) acrylate monomer and optionally a further monomer copolymerizable therewith has excellent transparency, antistatic properties and practical physical properties, leading to the completion of the present invention.

In the present invention, there is thus provided a nitrile resin composition which comprises (A) 80 to 97 wt. % of a nitrile resin which is obtained by the graft copolymerization, in the presence of 3 to 30 parts by weight of a rubbery polymer containing at least 50 wt. % of a conjugated diene unit, of 100 parts by weight of a monomer mixture containing an unsaturated nitrile monomer and an alkyl (meth) acrylate monomer and has, as a matrix component, 65 to 80 wt. % of an unsaturated nitrile monomer unit and 20 to 35 wt. % in total of an alkyl (meth)acrylate monomer unit and a unit of a further monomer copolymerizable with the unsaturated nitrile monomer and alkyl (meth)acrylate monomer; and (B) 3 to 20 wt. % of a polyether ester amide, wherein the ratio of the melt viscosity of the component (A) to that of the component (B) at 210° C. ranges from 0.5 to 5 at a shear rate of $10^2$ $sec^{-1}$ and ranges from 0.5 to 3 at a shear rate of $10^3$ $sec^{-1}$; and the difference of the refractive index between the matrix component (A) to the component (B) falls within a range of 0.02.

DESCRIPTION OF THE PREFERRED EMBODIMENTS

The present invention is characterized by that with a view to improving the antistatic properties of a nitrile resin, a polyether ester amide having a specific melt viscosity and having a difference of a refractive index within a range of 0.02 from that of the matrix component of the nitrile resin having the above-described composition is selected from various antistatic agents and it is added in a specific amount to the nitrile resin. The resin composition of the present invention is therefore excellent in not only antistatic properties but also transparency and practical physical properties. As a result, it is markedly useful as an antistatic material for various parts of electronics products, household electronic appliances and office automation appliances, and various cases of semiconductor-wafer-related products, IC-related products, mask/reticule-related products, liquid-crystal-display-related products.

The term "matrix component" as used herein means a polymer composed of monomer units other than a rubbery component. The term "alkyl (meth)acrylate" means an alkyl acrylate or alkyl methacrylate.

The present invention will hereinafter be described more specifically.

The nitrile resin composition of the present invention is prepared by adding, to a nitrile resin, a specific amount of a polyether ester amide which has a specific melt viscosity and has a difference of a refractive index within a range of 0.02 from that of the matrix component of the nitrile resin.

In the present invention, the nitrile resin is prepared by the graft copolymerization, in the presence of a rubbery polymer, of a monomer mixture composed of an unsaturated nitrile monomer, an alkyl (meth)acrylate monomer and optionally a further monomer copolymerizable therewith.

Examples of the rubbery polymer to be used for the preparation of the nitrile resin include polymers composed only of a conjugated diene unit and copolymers composed of a conjugated diene unit and a unit of a monomer, such as unsaturated nitrile monomer, aromatic vinyl monomer, unsaturated carboxylate monomer or the like, which is copolymerizable with the conjugated diene monomer.

Examples of the conjugated diene monomer include, in addition to 1,3-butadiene, isoprene, chloroprene, 2,3-dimethyl-1,3-butadiene and 2,3-diethyl-1,3-butadiene. Among them, 1,3-butadiene and isoprene are preferred from the viewpoints of availability and good polymerizability.

Examples of the unsaturated nitrile monomer include acrylonitrile, methacrylonitrile and α-chloroacrylonitrile, with the acrylonitrile and methacrylonirile being preferred. Examples of the aromatic vinyl monomer include styrene and α-methylstyrene. Examples of the unsaturated carboxylate monomer include alkyl acrylates and alkyl methacrylates having a $C_{1-4}$ alkyl group. Preferred are methyl (meth) acrylate and ethyl (meth)acrylate.

More specifically, preferred examples of the rubbery polymer include 1,3-butadiene polymer, 1,3-butadiene-acrylonitrile copolymer, 1,3-butadiene-acrylonitrile and methacrylonitrile copolymer, 1,3-butadiene-acrylonitrile and styrene copolymer and 1,3-butadiene-styrene copolymer, with the 1,3-butadiene polymer, 1,3-butadiene-acrylonitrile copolymer and 1,3-butadiene-styrene copolymer being more preferred.

The proportion of the conjugated diene unit contained in such a rubbery polymer affects the impact resistance of the resulting nitrile resin. In consideration of such a point, the proportion of the conjugated diene unit is preferably at least 50 wt. %, more preferably at least 60 wt. %.

The proportion of the rubbery polymer in the nitrile resin affects the impact resistance, chemical resistance, moldability or formability of the resin. When the amount of the rubbery polymer is 3 wt. % or greater, the resulting resin has good impact resistance. When it is 30 wt. % or less, on the other hand, the resulting resin has good chemical resistance and moldability or formability. The amount of the rubbery polymer in the nitrile resin is therefore preferred to fall within a range of 3 to 30 wt. %, with a range of 5 to 20 wt. % being more preferred.

The rubbery polymer can be prepared in known processes but emulsion polymerization is suited. Although there is no particular limitation imposed on the polymerization temperature, a temperature ranging from 30 to 70° C. is preferred in view of the polymerization rate and productivity.

As monomers to be used in the graft copolymerization in the presence of the above-described rubbery polymer, a saturated nitrile monomer and alkyl (meth)acrylate monomer and if necessary a further monomer copolymerizable therewith may be employed.

Examples of the unsaturated nitrile monomer to be used for the graft copolymerization include acrylonitrile, methacrylonitrile and α-chloroacrylonitrile, with the acrylonitrile and methacrylonitrile being preferred. The properties of the nitrile resin depend on the composition of the unsaturated nitrile unit contained in the matrix component. Described specifically, the proportions of the unsaturated nitrile monomer unit not less than 65 wt. % provide a nitrile resin having good chemical resistance and good gas barrier properties, while the proportions not greater than 80 wt. % provide a resin which has good moldability or formability and at the same time has good color tone without yellowing at the time of molding or forming. It is therefore preferred that the unsaturated nitrile unit is contained in the matrix component in an amount of 65 to 80 wt., preferably 70 to 80 wt. %.

Examples of the alkyl (meth)acrylate monomer to be used as a monomer for the graft copolymerization include methyl (meth)acrylate, ethyl (meth)acrylate, propyl (meth)acrylate and butyl (meth)acrylate. The properties of the resulting nitrile resin vary, depending on the kind of the alkyl group of the alkyl (meth)acrylate. Among them, methyl (meth) acrylate and ethyl (meth)acrylate are preferred in order to maintain the practical physical properties of the resulting nitrile resin at a high level.

The further monomer copolymerizable with the above-described unsaturated nitrile monomer and alkyl (meth) acrylate monomer is an unsaturated compound which can be subjected to radical polymerization. Examples include aromatic vinyl monomer, vinyl ethers, vinyl esters and α-olefins. Specifically, examples of the aromatic vinyl monomer include styrene, α-methylstyrene, vinyltoluene and vinylxylene; those of the vinyl ester include vinyl acetate, vinyl propionate and vinyl butyrate; those of the vinyl ether include methyl vinyl ether, ethyl vinyl ether, propyl vinyl ether, butyl vinyl ether, methyl isopropenyl ether and ethyl isopropenyl ether; those of the α-olefin include isobutene, 2-methyl-1-butene, 2-methyl-1-pentene, 2-methyl-hexene, 2-methyl-1-heptene, 2-methyl-1-octene, 2-ethyl-1-butene and 2-propyl-1-butene. Among them, styrene is preferred.

The composition of the alkyl (meth)acrylate monomer unit and the optionally-employed unit of a monomer copolymerizable with the unsaturated nitrile monomer and alkyl (meth)acrylate monomer affects the properties of the resulting nitrile resin. Described specifically, when the total proportion of the alkyl (meth)acrylate monomer unit and the unit of a monomer copolymerizable with the unsaturated nitrile monomer and alkyl (meth)acrylate monomer is less than 20 wt. %, the resulting resin has deteriorated moldability or formability. When the proportion exceeds 35 wt. %, on the other hand, the resulting resin has lowered chemical resistance and gas barrier properties. It is therefore preferred that the alkyl (meth)acrylate monomer unit and the unit of a monomer copolymerizable with the unsaturated nitrile monomer and alkyl (meth)acrylate monomer are contained in a total amount of 20 to 35 wt. %, preferably 20 to 30 wt. % in the matrix component.

The unit of a further monomer copolymerizable with the unsaturated nitrile monomer and alkyl (meth)acrylate monomer may be contained in an amount of about 20 wt. % at the maximum in the matrix component. Amounts not greater than 20 wt. % have no serious effect on the properties of the resulting nitrile resin and the resin so obtained can be used freely according to the using purpose.

The nitrile resin relating to the present invention can be polymerized by any one of the known processes such as emulsion polymerization, solution polymerization, suspension polymerization or bulk polymerization or combination thereof. Emulsion polymerization is however preferred in consideration of easy removal of the polymerization heat, easy post-treatment after the polymerization, simplification of the incidental equipment for the recovery and regeneration of an organic solvent. In the case of emulsion polymerization, the polymer product obtained as a latex is solidified by a conventionally known method such as coagulation method by using an electrolyte or solvent or freezing method, followed by separation, washing with water and drying, whereby the resulting resin can be obtained.

Upon graft copolymerization, a known surfactant ordinarily used for emulsion polymerization can be used. As such, usable is at least one anionic surfactant selected from fatty acid salts, alkylsulfate ester salts, alkylbenzenesulfonate salts, alkylnaphthalenesulfonate salts, alkylsulfosuccinate salts, alkyldiphenylether disulfonate salts, alkylphosphate salts, polyoxyethylene alkylsulfate ester salts, polyoxyethylene alkylallylsulfate ester salts, naphthalenesulfonic acid formalin condensates and polyoxyethylene alkylphosphate esters. The surfactant used in the emulsion polymerization remains in the resin, but its remaining amount varies, depending on the solidification conditions, separation degree or washing degree with water.

The surfactant is preferably contained in the nitrile resin in an amount of 0.05 to 2 wt. % so that the nitrile resin composition of the present invention can exhibit antistatic properties.

No particular limitation is imposed on the temperature of the graft polymerization. It can be carried out at any temperature within a range of 0 to 100° C. In consideration of the polymerization rate, conversion ratio, productivity and the like, a temperature range of from 30 to 70° C. is preferred. After polymerization, a plasticizer, stabilizer, lubricant, dyestuff and pigment, filler, surfactant and/or the like can be added as needed.

In the graft polymerization of the nitrile resin of the present invention, the composition of the monomer mixture comprised mainly of an unsaturated nitrile monomer has a direct influence on the composition of the resulting matrix. In other words, the composition of the monomer mixture becomes substantially similar to that of the matrix.

The molecular weight and molecular weight distribution of the matrix component also have an influence on the properties of the nitrile resin. Incidentally, in the present invention, the matrix component is designated as a soluble portion in N,N-dimethylformamide and acetonitrile as will be described later in the measuring method in Examples. When the matrix component has a weight average molecular weight of 30,000 or greater, the resulting resin has good mechanical properties such as impact resistance. When the weight average molecular weight is not greater than 200,000, the resulting resin has suitable fluidity and good moldability or formability.

With the forgoing in view, the weight average molecular weight of the nitrile resin preferably ranges from 30,000 to 200,000, more preferably from 40,000 to 180,000. With a ratio of the weight average molecular weight to the number average molecular weight as a measure, the molecular weight distribution of the nitrile resin preferably ranges from 1 to 2 in consideration of the mechanical properties of the resin such as impact resistance.

The above-described nitrile resin can be molded or formed by various methods such as extrusion or injection molding. In view of the shear rate, mechanical properties, moldability or formability and compatibility with the polyether ester amide in the above molding or forming method, the nitrile resin preferably has a melt viscosity within a range of 300 to 4,000 Pa.sec at 210° C. and at a shear rate of $10^2$ $sec^{-1}$ or within a range of 150 to 800 Pa.sec at 210° C. and at a shear rate of $10^3$ $sec^{-1}$. It is more preferred that the nitrile resin satisfies these melt viscosities at the same time.

In order to allow the nitrile resin to exhibit excellent transparency, it is preferred that the difference of a refractive index, as measured by the method which will be described later in Examples, between the above-described rubbery polymer and the matrix component is 0.02 or less, with 0.01 or less being more preferred.

In the present invention, in order to maintain the transparency and practical physical properties of the nitrile resin having the above-described composition and to improve its antistatic properties, a polyether ester amide (B) which has a specific melt viscosity relative to the melt viscosity of the nitrile resin (A). A difference of a refractive index between the polyether ester amid (B) and the matrix component of the nitrile resin (A) is not greater than 0.02 is selected and added in a specific amount.

Described specifically, it is preferred to select a polyether ester amide having a refractive index of about 1.48 to 1.55 in consideration that the matrix component of the nitrile resin has a refractive index of about 1.50 to 1.53. Judging from the melt viscosity of the nitrile resin upon molding or forming, preferred as the polyether ester amide are derivatives from a polyamide having carboxyl groups at both ends and an ethylene oxide adduct of a bisphenol.

Examples of the polyamide having carboxyl groups at both ends include a ring-opening polymer of a lactam, polycondensates of an aminocarboxylic acid and polycondensates of a dicarboxylic acid and a diamine. Examples of the lactam for preparation of a ring-opening polymer of lactam include caprolactam, enantholactam, laurolactam and undecanolactam. Examples of the aminocarboxylic acid include ω-aminocaproic acid, ω-aminoenanthic acid, ω-aminocaprylic acid, ω-aminopelargonic acid, ω-aminocapric acid, 11-aminoundecanoic acid and 12-aminoundecanoic acid.

Examples of the dicarboxylic acid include adipic acid, azelaic acid, sebacic acid, undecanedioic acid, dodecanedioic acid and isophthalic acid and those of the diamine include hexamethylenediamine, heptamethylenediamine, octamethylenediamine and decamethylenediamine.

The above monomers may be used in combination. Preferred examples include caprolactam, 12-aminododecanoic acid and adipic acid-hexamethylenediamine, with the caprolactam being particularly preferred.

The above-described polyamide having carboxyl groups at both ends thereof can be obtained by using a $C_{4-20}$ dicarboxylic acid or its metal salt component as a molecular-weight modifier and, in the presence of it, subjecting the above-described amide-forming monomer to ring-opening polymerization or polycondensation. Examples of the $C_{4-20}$ dicarboxylic acid include aliphatic carboxylic acids such as succinic acid, glutaric acid, adipic acid, pimelic acid, suberic acid, azelaic acid, sebacic acid, undecanedioic acid and dodecanedioic acid; aromatic dicarboxylic acids such as terephthalic acid, isophthalic acid, phthalic acid and naphthalenedicarboxylic acid; aliphatic dicarboxylic acids such as 1,4-cyclohexanedicarboxylic acid and dicyclohexyl-4,4-dicarboxylic acid; and alkali metal salts of 3-sulfoisophthalic acid such as sodium 3-sulfoisophthalate and potassium 3-sulfoisophthalate. Among them, aliphatic dicarboxylic acids, aromatic dicarboxylic acids and alkali metal salts of 3-sulfoisopthalic acid are preferred, with adipic acid, sebacic acid, terephthalic acid, isophthalic acid and sodium 3-sulfoisophthalate being particularly preferred.

The polyamide having carboxyl groups at both ends thereof generally has a number average molecular weight of 500 to 5,000, preferably 500 to 3,000.

Examples of the bisphenol to be used for the synthesis of an ethylene oxide adduct of a bisphenol include bisphenol A (4,4'-dihydroxydiphenyl-2,2-propane), bisphenol F (4,4'-dihydroxydiphenylmethane), bisphenol S (4,4'-dihydroxydiphenylsulfone) and 4,4'-dihydroxydiphenyl-2,2-butane. Among them, bisphenol A is preferred.

The ethylene oxide adduct of a bisphenol can be obtained by adding an ethylene oxide to the above-described bisphenol by a method known to date. In addition to the ethylene oxide, another alkylene oxide (propylene oxide, 1,2-butylene oxide, 1,4-butylene oxide or the like) can be added in combination. The another alkylene oxide is usually added in an amount of 10 wt. % or less based on the amount of the ethylene oxide.

The ethylene oxide adduct of a bisphenol usually has a number average molecular weight of 1,600 to 3,000. The adduct with 32 to 60 moles of an ethylene oxide is particularly preferred.

The ethylene oxide adduct of a bisphenol is used in an amount ranging from 20 to 80 wt. % based on the total amount of the polyamide and the ethylene oxide adduct of a bisphenol.

There is no particular limitation is imposed on the preparation process of a polyether ester amide to be used in the present invention. It is prepared, for example, by reacting an amide forming monomer with a dicarboxylic acid, adding to the resulting polyamide an ethylene oxide adduct of a bisphenol and then polymerizing the mixture at high temperature under reduced pressure.

The content of the polyether ester amide is required to be 3 to 20 wt. %, preferably 5 to 20 wt. % in the resulting resin composition. Contents less than 3 wt. % do not bring about sufficient antistatic properties, while contents exceeding 20 wt. % lower the mechanical properties such as rigidity. Contents outside the above range are not therefore preferred.

In consideration of the compatibility with the above-described nitrile resin, the polyether ester amide is preferred to have a melt viscosity ranging from 300 to 1,500 Pa.sec at 210° C. and a shear rate of $10^2$ $sec^{-1}$ or ranging from 150 to 400 Pa.sec at 210° C. and a shear rate of $10^3$ $sec^{-1}$. The polyether ester amide which can satisfy both of the above requirements for the melt viscosity at the same time is more preferred.

In order to allow the nitrile resin composition to exhibit antistatic properties and maintain practical physical properties and appearance, a melt viscosity ratio at the time of molding or forming of the nitrile resin and polyether ester amide is important. In consideration of the resin temperature and shear rate at the time of molding or forming, a ratio of the melt viscosity of the nitrile resin to that of the polyether ester amide is preferred to fall within a range of 0.5 to 5 at 210° C. and a shear rate of $10^2$ $sec^{-1}$ or a range of 0.5 to 3 at 210° C. and a shear rate of $10^3$ $sec^{-1}$. It is preferred that both of the above ranges are satisfied at the same time.

At the melt viscosity ratio below the above-described range, the ratio of the polyether ester amide existing on the surface of the molded or formed product lowers, which requires a large amount of the polyether ester amide to allow the resulting nitrile resin composition to exhibit antistatic properties, thereby deteriorating its mechanical properties. At the melt viscosity ratio exceeding the above range, on the other hand, the compatibility between the nitrile resin and polyether ester amide decreases, whereby a peeling phenomenon or the like appears on the molded or formed product and impairs the appearance of it and in addition, the mechanical properties of the nitrile resin composition decrease.

For the molded or formed product made of the nitrile resin composition composed of the nitrile resin and polyether ester amide to exhibit excellent transparency, it is preferred that the difference of the refractive index between the matrix component and polyether ester amide of the nitrile resin is 0.02 or less, more preferably 0.01 or less.

Examples of the commercially available polyether ester amide used preferably in the present invention include "Pellestat 6321" (refractive index: 1.51) and "Pellestat 7530" (refractive index: 1.53) (each, trade name; product of Sanyo Chemical Industries, Ltd.).

Although there is no particular limitation imposed on the preparation process of the nitrile resin composition of the present invention, it is prepared by kneading and granulating in a kneader such as single screw extruder, twin screw extruder, Banbury mixer, roll mixer, Brabender Plastograph or kneader blender.

The nitrile resin composition so obtained can be molded or formed by the known method usually employed for the molding or forming of a thermoplastic resin, for example, injection molding, extrusion molding, blow molding, vacuum forming or blown film extrusion.

The nitrile resin composition of the present invention is able to have more improved antistatic properties by the addition of a cationic, anionic, nonionic or amphoteric antistatic agent. Surfactants can be used as such antistatic agent.

Examples of the cationic surfactant include alkylamine salts and quaternary ammonium salts; those of the anionic surfactant include fatty acid salts, alkyl sulfate ester salts, alkylbenzenesulfonate salts, alkylnaphthalenesulfonate salts, alkylsulfosuccinate salts, alkyl diphenyl ether disulfonate salts, alkyl phosphate salts, polyoxyethylene alkyl sulfate ester salts, polyoxyethylene alkylallyl sulfate ester salts, naphthalenesulfonic acid formalin condensates and polyoxyethylene alkyl phosphate esters.

Examples of the nonionic surfactant include alkylene oxides, amine oxides, phosphates, alkyl polyglycol ethers and alkylamine polyglycol ethers. Those of the amphoteric ionic surfactants include betaines.

When the surfactant is added, it is preferred to add it in an amount to give 0.1 to 5 wt. % as its content in the resin composition.

The addition of an ordinarily-employed additive such as plasticizer, mold release agent, weatherproofing agent, antioxidant, flame-retardant, colorant and/or stabilizer never disturbs the advantages of the present invention.

The nitrile resin composition available by the above process is a novel nitrile resin composition having excellent transparency, antistatic properties and practical physical properties.

The nitrile resin composition of the present invention can be used as a molding or forming material for various parts of electronics products, household electric applicances, OA apparatuses and various cases of semiconductor-waferrelated products, IC-related products, mask/reticule-related products, liquid-crystal-display-related products, especially cases of semiconductor-wafer-related products such as carriers for semiconductor wafers, process carriers for semiconductor wafers and shopping boxes for semiconductor wafers; cases of IC-related products such as IC magazine, IC tray and IC chip carrying case; cases of mask/reticule-related products such as mask/reticule carriers, mask/reticule packages, mask/reticule carrying boxes, carriers for a mask/reticule substrate glass and pellicle case; cases of liquid-crystal-display-related products such as liquid-crystal display carriers, liquid-crystal display process carriers and carriers for the substrate glass of a liquid-crystal display.

EXAMPLES

The present invention will hereinafter be described more specifically by examples and comparative examples, in which all designations of "parts" and "%" indicate parts by weight and wt. %, respectively. The total conversion ratio, composition of the matrix component, determination of the anionic surfactant, refractive index, melt viscosity, flexural strength, flexural modulus, tensile yield strength, Izod impact strength, deflection temperature under load, Vicat softening point, melt index, whole light transmittance, haze, surface resistivity and appearance of molded or formed product, each described in examples and comparative examples, were measured in accordance with the methods described below.

(1) Total conversion ratio (wt. %)

The concentration of each monomer remaining in the latex after the polymerization of the nitrile resin was measured by gas chromatograph [type "GC-9A", product of Shimadzu Corporation], whereby the total conversion ratio of all the monomers, which had been fed to the polymer system, to the polymer was calculated.

(2) Composition of the matrix component (wt. %)

To 75 ml of N,N-dimethylformamide, 0.75 g of the resin obtained by the above-described process was added at 25° C., followed by stirring for 2 hours. To the reaction mixture, 75 ml of acetonitrile were added and they were stirred for one hour. The component dissolved in the solvent was separated, whereby the matrix component except the rubber component was obtained. The CHN-containing composition of the matrix component was measured by elementary analysis ["CHN CORDER, type MT-2", product of Yanagimoto Seisakujo]. The measurement was repeated three times and, from the average, the composition of the matrix was determined.

(3) Determination of the anionic surfactant (wt. %)

1) Extraction of the anionic surfactant

The nitrile resin obtained was pulverized by the freeze crushing method. By a Soxhlet extractor, 0.5 g of the pulverized resin was extracted with 100 ml of ethanol at the boiling point of ethanol for 15 hours. After cooling, the extracted liquid was heated to distill off the ethanol, whereby an extract was obtained.

2) Determination of the anionic surfactant

The resulting extract was diluted with ultrapure water, followed by the addition of methylene blue for color development. The anionic surfactant was determined from the calibration curve which had been made in advance to show the relationship between the concentration of the surfactant and absorbance.

(4) Refractive index

A refractive index of a test piece of 10 mm wide, 20 mm long and 3 mm thick was measured at 20° C. by an Abbe's refractometer by using 1-bromonaphthalene as a contact liquid.

(5) Melt viscosity (Pa.sec)

The melt viscosity was measured using "Capirograph 1C" (trade name; product of Toyo Seiki Seisaku-Sho Ltd.) under the conditions of a nozzle length of 5 mm, 10 mm or 20 mm, a nozzle diameter of 1 mm and a temperature of 210° C. The measured value was subjected to Baglay end correction and Rabinowitch correction, which was designated as a melt viscosity.

(6) Flexural strength, flexural modulus (MPa)

Flexural strength and flexural modulus of a test piece of 3.2 mm thick were measured using "Autograph AG-5000A" (product of Shimadzu Corporation) under the conditions of 23° C. and 60% RH in accordance with the method prescribed in ASTM D-790.

(7) Tensile yield strength (MPa)

Tensile yield strength of a test piece of 3.2 mm thick was measured using "Autograph AG-5000A" (product of Shimadzu Corporation) under the conditions of 23° C. and 60% RH in accordance with the method prescribed in ASTM D-638.

(8) Izod impact resistance (J/m)

Izod impact strength of a notched test piece of 3.2 mm thick was measured using an Izod tester (product of Shimadzu Corporation) under the conditions of 23° C. and 60% RH in accordance with the method prescribed in ASTM D-256.

(9) Deflection temperature under load (°C.)

The deflection temperature of a test piece of 3.2 mm thick was measured using "Heat Distortion Tester HDA" (product of Yasuda Seiki Seisaku-Sho, Ltd.) at a stress of 0.45 MPa in accordance with the method prescribed in ASTM D-648.

(10) Vicat softening point (°C.)

The Vicat softening point was measured using "Heat distortion tester HDA" (product of Yasuda Seiki Seisaku-Sho Ltd.) in accordance with the method prescribed in ASTM D-1525.

(11) Melt index (g/10 min)

The melt index was measured using "Melt indexer S-111" (product of Toyo Seiki Seisaku-Sho Ltd.) under the temperature of 200° C. and a load of 122.5N in accordance with the method prescribed in ASTM D-1238.

(12) Whole light transmittance, haze (%)

The whole light transmittance and haze of the disc-shaped sample of 2 mm thick and 50 mm in diameter were measured using a direct-reading haze meter (product of Toyo Seiki Seisaku-Sho Ltd.) under the conditions of 23° C. and 60% RH in accordance with the method prescribed in JIS K-7105.

(13) Surface resistivity (Ω/○)

(a) A disc-shaped test piece of 2 mm thick and 50 mm in diameter was formed, followed by conditioning at 23° C. and 60% RH for 48 hours. In accordance with the method prescribed in ASTM D-257, the surface resistivity of the resulting test piece was measured using a superhigh insulation resistance tester "SM-8210" (electrode part: "SME-8311") (product of Toa Denpa Kogyo Co., Ltd.) under the conditions of an applied voltage of 500 V, 23° C. and 60% RH.

(b) After a disc-shaped test piece similar to that of the above (a) was formed, it was washed with an aqueous solution of a detergent ("Mamalemon", product of Lion Corporation) and then washed sufficiently with deionized water. The water was removed from the surface by drying, whereby the measurement was carried out in a similar manner to (a).

(14) Appearance of a molded or formed product

The appearance of a test piece was visually observed and judged in accordance with the following three ranks: A:

markedly good appearance without peeling; B: good appearance without peeling; C: poor appearance with peeling.
Preparation of a nitrile resin Preparation Example 1

(A) Preparation of a rubbery polymer

A mixture of the components described below were charged in a stainless-steel polymerization reactor and polymerization was carried out under stirring at 45° C. for 20 hours in a nitrogen atmosphere. The polymerization was completed at a conversion ratio of 90%. The unreacted monomers were removed by stripping under reduced pressure, whereby a rubbery polymer having a solid concentration of about 30% was obtained. The solid was recovered from the resulting product, followed by drying. As a result of elemental analysis, it was found that the contents of 1,3-butadiene and acrylonitrile units in the polymer were 71 wt. % and 29 wt. %, respectively.

30 parts of acrylonitrile, 70 parts of 1,3-butadiene, 2.4 parts of fatty acid soap, 0.3 part of azobisisobutylonitrile, 0.5 part of t-dodecylmercaptane and 200 parts of water.

(B) Preparation of a graft polymer

The raw material (to be added first) composed of the following components was charged in a stainless-steel polymerization reactor, followed by heating to 58° C. under stirring in a nitrogen atmosphere. After the stirring was continued for 30 minutes at the same temperature, an aqueous solution containing 0.08 part of potassium persulfate was added as a polymerization initiator to start polymerization.

15 parts of acrylonitrile, 5 parts of methyl acrylate, 10.0 parts of the above-described rubbery polymer (A) (solid content), 0.407 part of sodium dioctylsulfosuccinate, 0.103 part of polyvinylpyrrolidone, 0.035 part of sodium hexametaphosphate and 150 parts of water Twenty five minutes after the polymerization was started, phosphoric acid was added to adjust the reaction mixture to pH 3±0.3. After 30 minutes, the raw material (to be added secondly) composed of the below-described components was successively added and the polymerization was continued over 6.5 hours at 58° C.

60 parts of acrylonitrile, 20 parts of methyl acrylate, 1.6 parts of pentaerythritol tetrakis(β-mercaptopropionate), 1.627 parts of sodium dioctylsulfosuccinate, 0.413 part of polyvinyl pyrrolidone, 0.141 part of sodium hexametaphosphate and 85 parts of water.

While the above-described addition, phosphoric acid was added continuously for 5 hours from the beginning of the polymerization and the polymerization was carried out with a polymerization system being maintained at pH of 3±0.3 for 7 hours. Eight hours after the beginning of the polymerization, the reaction mixture was cooled, whereby the polymerization was completed. The total conversion ratio was found to be 92.7%. The resulting resin was solidified by the addition of aluminum sulfate (concentration: 45%), followed by washing with water and drying, whereby a nitrile resin [A-1] was obtained as a powder. As a result of measurement by the above-described method, the refractive index of the matrix component of the resulting nitrile resin was found to be 1.51.

The main polymerizing conditions and results of the properties of the resin measured by the above-described methods are shown in Tables 1 and 2. Conditions and results of the resins obtained in Preparation Examples 2 to 6 are also shown in Tables 1 and 2.

Preparation Example 2

Polymerization was carried out in a similar manner to Preparation Example 1(B) except that the amounts of pentaerythritol tetrakis(β-mercaptopropionate) was changed to 2 parts, a nitrile resin [A-2] was obtained. The total conversion ratio was found to be 92.5%. As a result of measurement in accordance with the above-described method, the matrix component of the resulting nitrile resin was found to have a refractive index of 1.51.

Preparation Example 3

Polymerization was carried out in a similar manner to Preparation Example 1(B) except that the amount of pentaerythritol tetrakis(β-mercaptopropionate) was changed to 2.8 parts, a nitrile resin [A-3] was obtained. The total conversion ratio was found to be 93.1%. As a result of measurement in accordance with the above-described method, the matrix component of the resulting nitrile resin was found to have a refractive index of 1.51.

Preparation Example 4

Polymerization was carried out in a similar manner to Preparation Example 1(B) except that the amount of pentaerythritol tetrakis(β-mercaptopropionate) was changed to 3.2 parts and methyl acrylate was changed to ethyl acrylate, a nitrile resin [A-4] was obtained. The total conversion ratio was found to be 93.2%. As a result of measurement in accordance with the above-described method, the matrix component of the resulting nitrile resin was found to have a refractive index of 1.51.

Preparation Example 5

Polymerization was carried out in a similar manner to Preparation Example 1(B) except that concerning the raw material to be added first and that to be added secondly, the composition was partially changed as described below, a nitrile resin [A-5] was obtained. The total conversion ratio was found to be 92.8%. As a result of measurement in accordance with the above-described method, the matrix components of the resulting nitrile resin was found to have a refractive index of 1.52.

<Raw material to be added first>

15 parts of acrylonitrile, 2 parts of methyl acrylate and 3 parts of styrene

<Raw material to be added second>

60 parts of acrylonitrile, 8 parts of methyl acrylate, 12 parts of styrene and 2.2 parts of pentaerythritol tetrakis(β-mercaptopropionate)

Preparation Example 6

Polymerization was carried out in a similar manner to Preparation Example 1(B) except that concerning the raw material to be added first and that to be added secondly, the composition was partially changed as described below, a nitrile resin [A-6] was obtained. The total conversion ratio was found to be 93.0%. As a result of measurement in accordance with the above-described method, the matrix component of the resulting nitrile resin was found to have a refractive index of 1.52.

<Raw material to be added first>

15 parts of acrylonitrile, 2 parts of ethyl acrylate and 3 parts of styrene

<Raw material to be added secondly>

60 parts of acrylonitrile, 8 parts of ethyl acrylate, 12 parts of styrene and 1.6 parts of pentaerythritol tetrakis(β-mercaptopropionate)

Preparation Example 7

Polymerization was carried out in a similar manner to Preparation Example 1(B) except that the amount of pentaerythritol tetrakis(β-mercaptopropionate) was changed to 1.0 part, a nitrile resin [A-7] was obtained. The total conversion ratio was found to be 92.5%. As a result of measurement in accordance with the above-described method, the matrix component of the resulting nitrile resin was found to have a refractive index of 1.51.

Preparation Example 8

Polymerization was carried out in a similar manner to Preparation Example 1(B) except that concerning the raw material to be added first and that to be added secondly, the composition was partially changed as described below, a nitrile resin [A-8] was obtained. The total conversion ratio was found to be 92.8%. As a result of measurement in accordance with the above-described method, the matrix component of the resulting nitrile resin was found to have a refractive index of 1.54.

<Raw material to be added first>

12 parts of acrylonitrile and 8 parts of styrene

<Raw material to be added second>

48 parts of acrylonitrile, 32 parts of styrene and 2 parts of pentaerythritol tetrakis(β-mercaptopropionate)

Preparation of a polyether ester amide

Preparation Example 9

A mixture containing the below-described components was charged in a stainless-steel polymerization reactor and under stirring, polymerized at 220° C. for 4 hours under hermetic pressure in a nitrogen atmosphere, whereby 96 parts of a polyamide oligomer having a number average molecular weight of 1,000 were obtained.

86 parts of ϵ-caprolactam, 14 parts of adipic acid, 0.3 part of an antioxidant ("Irganox 1010", trade name; product of Ciba Geigy) and 5 parts of water.

To the resulting oligomer, 144 parts of polyoxyethylene glycol having a number average molecular weight of 1,500 and 0.5 part of zirconyl acetate, followed by polymerization at 245° C. under pressure not higher than 1 mmHg for 5 hours, whereby a resin was obtained. The resulting resin was taken out as a strand on a belt and pelletized to obtain a polyether ester amide [B-3]. As a result of measurement in accordance with the above-described method, the polyether ester amide was found to have a refractive index of 1.50.

The properties of the resulting polyether ester amide were measured in accordance with the above-described methods and results are shown in Table 2. The measuring results of the properties of the polyether ester amide obtained in Preparation Example 8 are also shown in Table 2.

Preparation Example 10

A mixture containing the below-described components was charged in a stainless-steel polymerization reactor and under stirring, polymerized at 220° C. for 4 hours under hermetic pressure in a nitrogen atmosphere, whereby 96 parts of a polyamide oligomer having a number average molecular weight of 680 were obtained.

86 parts of ϵ-caprolactam, 4 parts of isophthalic acid, 10 parts of adipic acid, 0.3 part of an antioxidant ("Irganox 1010", trade name; product of Ciba Geigy) and 5 parts of water.

To the resulting oligomer, 224 parts of polyoxyethylene glycol having a number average molecular weight of 2,400 and 0.5 part of zirconyl acetate were added, followed by polymerization at 245° C. under pressure not higher than 1 mmHg for 5 hours, whereby a resin was obtained. The resulting resin was taken out as a strand on a belt and pelletized to obtain a polyether ester amide [B-4]. As a result of the measurement, the polyether ester amide was found to have a refractive index of 1.49.

TABLE 1

| | | Preparation Example | | | | | | | |
|---|---|---|---|---|---|---|---|---|---|
| | | A-1 | A-2 | A-3 | A-4 | A-5 | A-6 | A-7 | A-8 |
| Total amount of monomer | AN | 75 | 75 | 75 | 75 | 75 | 75 | 75 | 60 |
| mixture added | MA | 25 | 25 | 25 | — | 10 | — | 25 | — |
| (parts by weight) | EA | — | — | — | 25 | — | 10 | — | — |
| | ST | — | — | — | — | 15 | 15 | — | 40 |
| Amount of rubbery polymer added (parts by weight) | | 10 | 10 | 10 | 10 | 10 | 10 | 10 | 10 |
| Amount of molecular-weight modifier added (parts by weight) | | 1.6 | 2.0 | 2.8 | 3.2 | 2.2 | 1.6 | 1.0 | 2.0 |
| Total conversion ratio (wt.. %) | | 92.7 | 92.5 | 93.1 | 93.2 | 92.8 | 93.0 | 92.5 | 92.8 |
| Composition of matrix | AN | 75 | 75 | 74 | 74 | 74 | 74 | 75 | 59 |
| component (wt. %) | MA | 25 | 25 | 26 | — | 10 | — | 25 | — |
| | EA | — | — | — | 26 | — | 10 | — | — |
| | ST | — | — | — | — | 16 | 16 | — | 41 |
| Amount of anionic surfactant in acrylonitrile resin (wt. %) | | 0.6 | 0.6 | 0.5 | 0.7 | 0.6 | 0.5 | 0.5 | 0.7 |

Note>
AN: acrylonitrile
MA: methyl acrylate
EA: ethyl acrylate
ST: styrene

TABLE 2

| | | A-1 | A-2 | A-3 | A-4 | A-5 | A-6 | A-7 | A-8 | B-1 | B-2 | B-3 | B-4 |
|---|---|---|---|---|---|---|---|---|---|---|---|---|---|
| Refractive index of nitrite resin | Rubber component | 1.52 | 1.52 | 1.52 | 1.52 | 1.52 | 1.52 | 1.52 | 1.52 | — | — | — | — |
| | Matrix component | 1.51 | 1.51 | 1.51 | 1.51 | 1.52 | 1.52 | 1.51 | 1.54 | — | — | — | — |
| Refractive index of polyether ester amide | | — | — | — | — | — | — | — | — | 1.51 | 1.53 | 1.50 | 1.49 |
| Melt viscosity (Pa · sec) | At 210° C. and shear rate of $10^2$ $sec^{-1}$ | 2700 | 2000 | 1000 | 540 | 3400 | 2900 | 4800 | 3600 | 700 | 710 | 400 | 380 |
| | At 210° C. and shear rate of $10^3$ $sec^{-1}$ | 450 | 450 | 300 | 200 | 600 | 600 | 850 | 700 | 250 | 270 | 200 | 180 |
| Weight average molecular weight ($\times 10^4$) | | 16 | 12 | 8.8 | 6.2 | 13 | 16 | 22 | 13 | — | — | — | — |
| Weight average molecular weight/number average molecular weight | | 1.5 | 1.4 | 1.5 | 1.5 | 1.7 | 1.7 | 1.6 | 1.5 | — | — | — | — |

Examples 1 to 22, Comparative Examples 1 to 21

In each of Examples 1 to 22 and Comparative Examples 1 to 21, a mixture composed, according to the composition as shown in Table 3 or Table 4, of the nitrile resin obtained in one of Preparation Examples 1 to 8, the polyether ester amide which had been obtained in Preparation Example 9 or 10 or will be described below and a surfactant which will be described below was kneaded at a cylinder and dice temperature of 190° C. in a bidirectional twin extruder. The resulting strand was cooled with water and pelletized, whereby a nitrile resin composition was obtained. After drying at 65° C. for 6 hours, the pellets so obtained were injection molded into a test piece for the measurement of physical properties under the conditions of a cylinder and nozzle temperature of 190° C. and a mold temperature of 40° C. The various properties of the test piece were measured and evaluated in accordance with the above-described methods. The results are shown in Tables 5 and 6.

Polyether ester amide

B-1: Polyether ester amide "Pellestat 6321" (trade name; product of Sanyo Chemical Industries, Ltd.) (refractive index: 1.51)

B-2: Polyether ester amide "Pellestdt 7530" (trade name; product of Sanyo Chemical Industries, Ltd.) (refractive index: 1.53)

Surfactant

C-1: Polyethylene glycol "PEG400" (trade name; product of Sanyo Chemical Industries, Ltd.)

C-2: Sodium dodecylbenzenesulfonate "Newlex Powder F" (trade name; product of NOF CORPORATION)

C-3: Sodium secondary alkanesulfonate "Hostapur SAS93" (trade name; product of Hoechst Industry Co., Ltd.)

C-4: Polyoxyethylene lauryl ether phosphoric acid "Hostaphat L327" (trade name; product of Hoechst Industry Co., Ltd.)

TABLE 3

| Example | Nitrite resin (A) | | Polyether ester amide (B) | | Surfactant (C) | | Melt viscosity ratio | |
|---|---|---|---|---|---|---|---|---|
| | Kind | Wt. % | Kind | Wt. % | Kind | Wt. % | *1 | *2 |
| Ex. 1 | A-1 | 92.5 | B-1 | 7.5 | — | — | 3.9 | 1.8 |
| Ex. 2 | A-1 | 91.5 | B-1 | 7.5 | C-2 | 1 | | |
| Ex. 3 | A-1 | 90 | B-1 | 10 | — | — | | |
| Ex. 4 | A-1 | 89 | B-1 | 10 | C-1 | 1 | | |

TABLE 3-continued

| Example | Nitrite resin (A) | | Polyether ester amide (B) | | Surfactant (C) | | Melt viscosity ratio | |
|---|---|---|---|---|---|---|---|---|
| | Kind | Wt. % | Kind | Wt. % | Kind | Wt. % | *1 | *2 |
| Ex. 5 | A-1 | 89 | B-1 | 10 | C-2 | 1 | | |
| Ex. 6 | A-1 | 89 | B-1 | 10 | C-3 | 1 | | |
| Ex. 7 | A-1 | 89 | B-1 | 10 | C-4 | 1 | | |
| Ex. 8 | A-1 | 87.5 | B-i | 12.5 | — | — | | |
| Ex. 9 | A-1 | 85 | B-1 | 15 | — | — | | |
| Ex. 10 | A-2 | 90 | B-1 | 10 | — | — | | |
| Ex. 11 | A-2 | 89 | B-1 | 10 | C-3 | 1 | 2.9 | 1.8 |
| Ex. 12 | A-2 | 89 | B-1 | 10 | C-4 | 1 | | |
| Ex. 13 | A-2 | 87.5 | B-1 | 12.5 | — | — | | |
| Ex. 14 | A-2 | 85 | B-1 | 15 | — | — | | |
| Ex. 15 | A-3 | 90 | B-1 | 10 | — | — | 1.4 | 1.2 |
| Ex. 16 | A-3 | 87.5 | B-1 | 12.5 | — | — | | |
| Ex. 17 | A-3 | 85 | B-1 | 15 | — | — | | |
| Ex. 18 | A-4 | 87.5 | B-1 | 12.5 | — | — | 0.8 | 0.8 |
| Ex. 19 | A-5 | 90 | B-2 | 10 | — | — | 4.8 | 2.2 |
| Ex. 20 | A-5 | 89 | B-2 | 10 | C-1 | 1 | | |
| Ex. 21 | A-6 | 90 | B-2 | 10 | — | — | 4.1 | 2.2 |
| Ex. 22 | A-6 | 89 | B-2 | 10 | C-1 | 1 | | |

<Note>
*1: at 210° C. and a shear rate of $10^2$ $sec^{-1}$
*2: at 210° C. and a shear rate of $10^3$ $sec^{-1}$

TABLE 4

| Comparative Example | Nitrite resin (A) | | Polyether ester amide (B) | | Surfactant (C) | | Melt viscosity ratio | |
|---|---|---|---|---|---|---|---|---|
| | Kind | Wt. % | Kind | Wt. % | Kind | Wt. % | *1 | *2 |
| Comp. Ex. 1 | A-1 | 98 | B-1 | 2 | — | — | 3.9 | 1.8 |
| Comp. Ex. 2 | A-1 | 97 | B-1 | 2 | C-2 | 1 | | |
| Comp. Ex. 3 | A-1 | 75 | B-1 | 25 | — | — | | |
| Comp. Ex. 4 | A-1 | 75 | B-3 | 25 | — | — | 6.8 | 2.3 |
| Comp. Ex. 5 | A-1 | 85 | B-3 | 15 | — | — | | |
| Comp. Ex. 6 | A-2 | 98 | B-1 | 2 | — | — | 2.9 | 1.8 |
| Comp. Ex. 7 | A-2 | 75 | B-1 | 25 | — | — | | |
| Comp. | A-2 | 70 | B-1 | 30 | — | — | | |

TABLE 4-continued

| Comparative Example | Nitrite resin (A) Kind | Nitrite resin (A) Wt. % | Polyether ester amide (B) Kind | Polyether ester amide (B) Wt. % | Surfactant (C) Kind | Surfactant (C) Wt. % | Melt viscosity ratio *1 | Melt viscosity ratio *2 |
|---|---|---|---|---|---|---|---|---|
| Ex. 8 | | | | | | | | |
| Comp. Ex. 9 | A-3 | 98 | B-1 | 2 | — | — | 1.4 | 1.2 |
| Comp. Ex. 10 | A-3 | 75 | B-1 | 25 | — | — | | |
| Comp. Ex. 11 | A-5 | 98 | B-2 | 2 | — | — | 4.8 | 2.2 |
| Comp. Ex. 12 | A-5 | 97 | B-2 | 2 | C-2 | 1 | | |
| Comp. Ex. 13 | A-5 | 75 | B-2 | 25 | — | — | | |
| Comp. Ex. 14 | AS | 75 | B-3 | 25 | — | — | 8.5 | 3.0 |
| Comp. Ex. 15 | A-5 | 85 | B-4 | 15 | — | — | 8.9 | 3.3 |
| Comp. Ex. 16 | A-6 | 98 | B-1 | 2 | — | — | 4.1 | 2.4 |
| Comp. Ex. 17 | A-6 | 75 | B-1 | 25 | — | — | | |
| Comp. Ex. 18 | A-6 | 85 | B-4 | 15 | — | — | 7.6 | 3.3 |
| Comp. Ex. 19 | A-7 | 85 | B-3 | 15 | — | — | 12 | 4.3 |
| Comp. Ex. 20 | A-8 | 90 | B-1 | 10 | — | — | 5.1 | 2.8 |
| Comp. Ex. 21 | A-8 | 85 | B-1 | 15 | — | — | | |

<Note>
*1: at 210° C. and a shear rate of $10^2$ $sec^{-1}$
*2: at 210° C. and a shear rate of $10^3$ $sec^{-1}$

TABLE 5

| Example | Flexural strength MPa | Flexural modulus MPa | Tensile yield strength MPa | Izod impact strength J./m | Deflection temperature under load ° C. | Vicat softening point ° C. | Melt index g/10 min | Total light transmittance % | Haze % | Surface resistivity Ω/□ Before treatment | Surface resistivity Ω/□ After treatment | Appearance of molded or formed product |
|---|---|---|---|---|---|---|---|---|---|---|---|---|
| Ex. 1 | 92 | 3300 | 63 | 110 | 73.4 | 86.3 | 4.5 | 83 | 8.4 | $2 \times 10^{13}$ | $2 \times 10^{13}$ | A |
| Ex. 2 | 86 | 3200 | 62 | 100 | 73.3 | 86.3 | 5.0 | 75 | 15 | $9 \times 10^{12}$ | $8 \times 10^{12}$ | A |
| Ex. 3 | 88 | 3200 | 59 | 98 | 73.2 | 86.3 | 5.2 | 82 | 8.9 | $5 \times 10^{12}$ | $5 \times 10^{12}$ | A |
| Ex. 4 | 77 | 3100 | 55 | 76 | 72.3 | 84.8 | 6.1 | 82 | 8.9 | $1 \times 10^{12}$ | $2 \times 10^{12}$ | A |
| Ex. 5 | 73 | 2900 | 52 | 83 | 72.2 | 86.0 | 7.2 | 76 | 16 | $5 \times 10^{11}$ | $5 \times 10^{11}$ | A |
| Ex. 6 | 74 | 2900 | 51 | 85 | 72.1 | 85.9 | 7.4 | 75 | 18 | $3 \times 10^{11}$ | $3 \times 10^{11}$ | A |
| Ex. 7 | 74 | 3000 | 51 | 80 | 72.0 | 85.8 | 7.8 | 74 | 18 | $3 \times 10^{11}$ | $4 \times 10^{11}$ | A |
| Ex. 8 | 72 | 2800 | 53 | 85 | 73.2 | 85.8 | 5.6 | 80 | 10 | $2 \times 10^{11}$ | $3 \times 10^{11}$ | A |
| Ex. 9 | 72 | 2800 | 51 | 81 | 73.1 | 85.8 | 5.8 | 78 | 12 | $9 \times 10^{10}$ | $9 \times 10^{10}$ | B |
| Ex. 10 | 94 | 3200 | 62 | 87 | 73.2 | 85.3 | 13 | 83 | 8.0 | $5 \times 10^{12}$ | $5 \times 10^{12}$ | A |
| Ex. 11 | 88 | 3100 | 60 | 60 | 73.1 | 85.2 | 17 | 78 | 17 | $7 \times 10^{11}$ | $7 \times 10^{11}$ | A |
| Ex. 12 | 87 | 3100 | 60 | 59 | 73.1 | 85.3 | 16 | 78 | 16 | $8 \times 10^{11}$ | $8 \times 10^{11}$ | A |
| Ex. 13 | 85 | 3000 | 59 | 71 | 73.0 | 85.2 | 14 | 83 | 11 | $3 \times 10^{11}$ | $4 \times 10^{11}$ | A |
| Ex. 14 | 82 | 2900 | 56 | 63 | 72.9 | 85.2 | 15 | 82 | 14 | $9 \times 10^{10}$ | $1 \times 10^{11}$ | B |
| Ex. 15 | 86 | 3100 | 59 | 39 | 71.2 | 83.2 | 51 | 82 | 7.9 | $6 \times 10^{12}$ | $7 \times 10^{12}$ | A |
| Ex. 16 | 83 | 2900 | 57 | 39 | 70.9 | 83.2 | 53 | 81 | 12 | $5 \times 10^{11}$ | $5 \times 10^{11}$ | A |
| Ex. 17 | 83 | 2900 | 55 | 38 | 70.9 | 83.1 | 53 | 81 | 15 | $1 \times 10^{11}$ | $3 \times 10^{11}$ | A |
| Ex. 18 | 84 | 2800 | 55 | 37 | 70.7 | 83.0 | 88 | 82 | 12 | $2 \times 10^{12}$ | $1 \times 10^{12}$ | A |
| Ex. 19 | 89 | 3000 | 59 | 63 | 84.3 | 98.2 | 4.4 | 67 | 18 | $8 \times 10^{12}$ | $8 \times 10^{12}$ | B |
| Ex. 20 | 79 | 3000 | 55 | 47 | 82.9 | 96.8 | 5.1 | 67 | 18 | $4 \times 10^{12}$ | $4 \times 10^{12}$ | B |
| Ex. 21 | 85 | 2800 | 56 | 72 | 83.3 | 97.1 | 4.3 | 72 | 18 | $4 \times 10^{12}$ | $5 \times 10^{12}$ | B |
| Ex. 22 | 75 | 2800 | 52 | 58 | 81.9 | 95.9 | 5.0 | 72 | 18 | $2 \times 10^{12}$ | $3 \times 10^{12}$ | B |

TABLE 6

| Comparative Example | Flexural strength MPa | Flexural modulus MPa | Tensile yield strength MPa | Izod impact strength J./m | Deflection temperature under load ° C. | Vicat softening point ° C. | Melt index g/10 min | Total light transmittance % | Haze % | Surface resistivity Ω/□ Before treatment | Surface resistivity Ω/□ After treatment | Appearance of molded or formed product |
|---|---|---|---|---|---|---|---|---|---|---|---|---|
| Comp. Ex. 1 | 100 | 3500 | 71 | 130 | 74.0 | 86.4 | 4.3 | 83 | 8.1 | $3 \times 10^{15}$ | $3 \times 10^{15}$ | A |
| Comp. Ex. 2 | 88 | 3300 | 64 | 110 | 73.9 | 86.4 | 5.6 | 77 | 14 | $1 \times 10^{15}$ | $2 \times 10^{15}$ | A |
| Comp. Ex. 3 | 56 | 2100 | 40 | 52 | 72.6 | 84.1 | 7.0 | 74 | 18 | $8 \times 10^{10}$ | $9 \times 10^{10}$ | B |
| Comp. Ex. 4 | 50 | 1800 | 38 | 51 | 71.5 | 83.0 | 7.5 | 70 | 19 | $6 \times 10^{10}$ | $7 \times 10^{10}$ | C |
| Comp. Ex. 5 | 55 | 2000 | 42 | 58 | 73.2 | 85.7 | 6.5 | 72 | 18 | $2 \times 10^{10}$ | $4 \times 10^{10}$ | C |
| Comp. Ex. 6 | 100 | 3400 | 70 | 94 | 73.5 | 58.4 | 12 | 83 | 8.0 | $5 \times 10^{15}$ | $6 \times 10^{15}$ | A |
| Comp. Ex. 7 | 65 | 2200 | 48 | 40 | 72.5 | 83.7 | 18 | 81 | 20 | $8 \times 10^{10}$ | $8 \times 10^{10}$ | A |
| Comp. Ex. 8 | 56 | 1800 | 42 | 38 | 72.4 | 83.6 | 24 | 80 | 28 | $6 \times 10^{10}$ | $6 \times 10^{10}$ | B |
| Comp. Ex. 9 | 95 | 3400 | 65 | 40 | 71.5 | 83.7 | 43 | 83 | 6.8 | $6 \times 10^{15}$ | $5 \times 10^{15}$ | A |
| Comp. Ex. 10 | 68 | 2300 | 48 | 37 | 70.2 | 82.6 | 56 | 80 | 19 | $9 \times 10^{10}$ | $1 \times 10^{11}$ | A |
| Comp. Ex. 11 | 110 | 3400 | 70 | 82 | 84.5 | 98.4 | 2.6 | 75 | 10 | $1 \times 10^{10}$ | $9 \times 10^{15}$ | B |
| Comp. Ex. 12 | 97 | 3200 | 63 | 70 | 84.4 | 98.3 | 4.0 | 69 | 18 | $9 \times 10^{15}$ | $8 \times 10^{15}$ | B |
| Comp. Ex. 13 | 58 | 2100 | 41 | 42 | 83.8 | 97.4 | 6.3 | 62 | 30 | $2 \times 10^{11}$ | $3 \times 10^{11}$ | B |
| Comp. Ex. 14 | 48 | 1600 | 39 | 42 | 82.5 | 96.3 | 7.3 | 62 | 33 | $2 \times 10^{10}$ | $2 \times 10^{10}$ | C |
| Comp. Ex. 15 | 60 | 2000 | 41 | 41 | 83.4 | 97.3 | 6.2 | 16 | 82 | $7 \times 10^{11}$ | $8 \times 10^{11}$ | C |
| Comp. Ex. 16 | 100 | 3300 | 66 | 89 | 83.5 | 97.5 | 3.2 | 77 | 10 | $1 \times 10^{16}$ | $1 \times 10^{10}$ | B |
| Comp. Ex. 17 | 55 | 2000 | 39 | 45 | 82.7 | 96.6 | 6.2 | 60 | 38 | $3 \times 10^{11}$ | $4 \times 10^{11}$ | B |
| Comp. Ex. 18 | 58 | 2000 | 40 | 43 | 82.8 | 96.8 | 6.2 | 18 | 78 | $5 \times 10^{11}$ | $6 \times 10^{11}$ | C |
| Comp. Ex. 19 | 58 | 2200 | 44 | 58 | 74.2 | 86.7 | 0.8 | 68 | 21 | $1 \times 10^{10}$ | $3 \times 10^{10}$ | C |
| Comp. Ex. 20 | 82 | 3100 | 41 | 48 | 95.7 | 107.3 | 4.2 | 20 | 75 | $5 \times 10^{12}$ | $6 \times 10^{12}$ | C |
| Comp. Ex. 21 | 73 | 2700 | 37 | 36 | 95.4 | 106.5 | 5.0 | 12 | 84 | $6 \times 10^{11}$ | $7 \times 10^{11}$ | C |

Conclusion

Any one of the nitrile resin compositions (Examples 1 to 22) is excellent in optical properties (whole light transmittance, haze), mechanical properties (flexural modulus, flexural strength, tensile yield strength, Izod impact strength) and thermal properties (deflection temperature under load, Vicat softening point); and has a low surface resistivity. In addition, without a substantial change in the resistivity even by the surface treatment, it exhibits excellent antistatic properties. In short, the nitrile resin composition according to the present invention is excellent in transparency, antistatic properties and practical physical properties.

When the content of the polyether ester amide in the resin composition is less than 3 wt. % (Comparative Example 1, 2, 6, 9, 11, 12 or 16), the resulting nitrile resin composition is inferior in antistatic properties. When it exceeds 20 wt. %, on the other hand (Comparative Example 3, 4, 7, 8, 10, 13, 14 or 17), the resulting nitrile resin composition is inferior in flexural strength and flexural modulus.

When the difference of the refractive index between the matrix component of the nitrile resin and polyether ester amide exceeds 0.02 (Comparative Example 15, 18, 20 or 21), the resulting nitrile resin composition has impaired transparency.

When the ratio of the melt viscosity of the nitrile resin to that of the polyether ester amide at 210° C. and a shear rate of $10^2$ $sec^{-1}$ or a shear rate of $10^3$ $sec^{-1}$ is outside the above range (Comparative Example 4, 5 14, 15, 18, 19, 20 or 21), peeling occurs, which impairs the appearance of the molded or formed product.

Having excellent transparency, antistatic properties and practical physical properties, the nitrile resin composition of the present invention is suitable as an antistatic material for various parts of electronics products, household electric appliances and office automation apparatuses and various cases of semiconductor-wafer-related prodcts, IC-related products, mask/reticule-related products, liquid-crystal-display-related products.

What is claimed is:

1. A nitrile resin composition which comprises (A) 80 to 97 wt. % of a nitrile resin which is obtained by graft copolymerization of 100 parts by weight of a monomer mixture containing an unsaturated nitrile monomer and an alkyl (meth)acrylate monomer in the presence of 3 to 3.0 parts by weight of a rubbery polymer containing at least 50 wt. % of a conjugated diene unit, and has, as a matrix component of the nitrile resin, 65 to 80 wt. % of an unsaturated nitrile monomer unit and 20 to 35 wt. % in total of an alkyl (meth)acrylate monomer unit and a unit of a further monomer copolymerizable with the unsaturated nitrile and alkyl (meth)acrylate; and (B) 3 to 20 wt. % of a polyether ester amide, wherein the ratio of the melt viscosity of the component (A) to that of the component (B) at 210° C. is 0.5 to 5 at a shear rate of $10^2$ $sec^{-1}$ and 0.5 to 3 at a shear rate of $10^3$ $sec^{-1}$ and the difference of the refractive index between the matrix component (A) and the component (B) is 0.02 or less.

2. A molded or formed product according to claim 1, which is a part of electronics products, household electric applicances, office automation apparatuses or semiconductor-water products, IC products, mask/reticule products, and liquid-crystal-display products.

3. An antistatic molded or formed product obtained by molding or forming the nitrile resin composition according to claim 1.

4. A nitrile resin composition according to claim 1, wherein the rubbery polymer contained in the nitrile resin is at least one polymer selected from the group consisting of a 1,3-butadiene polymer, 1,3-butadiene-acrylonitrile copolymer and 1,3-butadiene-styrene copolymer.

5. An antistatic molded or formed product obtained by molding or forming the nitrile resin composition according to claim 4.

6. A nitrile resin composition according to claim 1, wherein the unsaturated nitrile monomer unit contained in the matrix component of the nitrile resin is at least one monomer unit selected from acrylonitrile or methacrylonitrile.

7. An antistatic molded or formed product obtained by molding or forming the nitrile resin composition according to claim 6.

8. A nitrile resin composition according to claim 1, wherein the alkyl (meth)acrylate monomer unit contained in the matrix component of the nitrile resin is at least one monomer unit selected from methyl (meth)acrylate or ethyl (meth)acrylate.

9. An antistatic molded or formed product obtained by molding or forming the nitrile resin composition according to claim 8.

10. A nitrile resin composition according to claim 1, wherein the content of the monomer unit copolymerizable with the unsaturated nitrile monomer and alkyl (meth) acrylate monomer is 20 wt. % at the maximum.

11. An antistatic molded or formed product obtained by molding or forming the nitrile resin composition according to claim 10.

12. A nitrile resin composition according to claim 10, wherein the copolymerizable monomer unit is a styrene unit.

13. An antistatic molded or formed product obtained by molding or forming the nitrile resin composition according to claim 12.

14. A nitrile resin composition according to claim 1, wherein the matrix component of the nitrile resin has a weight average molecular weight of 30,000 to 200,000 and a ratio of the weight average molecular weight to the number average molecular weight ranges from 1 to 2.

15. An antistatic molded or formed product obtained by molding or forming the nitrile resin composition according to claim 14.

16. A nitrile resin composition according to claim 1, wherein the melt viscosity of the nitrile resin at 210° C. ranges from 300 to 4,000 Pa.sec at a shear rate of $10^2$ $sec^{-1}$ and 150 to 800 Pa.sec at a shear rate of $10^3$ $sec^{-1}$.

17. An antistatic molded or formed product obtained by molding or forming the nitrile resin composition according to claim 16.

18. A nitrile resin composition according to claim 1, wherein the polyether ester amide (B) is a derivative from a polyamide having carboxyl groups at both ends thereof and an ethylene oxide adduct of a bisphenol.

19. A nitrile resin composition according to claim 18, wherein the polyamide having carboxyl groups at both ends thereof is at least one polyamide selected from the group consisting of a ring-opening polymer of a lactam, polycondensates of an aminocarboxylic acid and polycondensates of a dicarboxylic acid and a diamine.

20. An antistatic molded or formed product obtained by molding or forming the nitrile resin composition according to claim 19.

21. A nitrile resin composition according to claim 18, wherein the polyamide having carboxyl groups at both ends thereof has a number average molecular weight of 500 to 5,000.

22. An antistatic molded or formed product obtained by molding or forming the nitrile resin composition according to claim 21.

23. A nitrile resin composition according to claim 18, wherein the bisphenol is at least one compound selected from the group consisting of bisphenol A (4,4'-dihydroxydiphenyl-2,2-propane), bisphenol F (4,4'-dihydroxydiphenylmethane), bisphenol S (4,4'-dihydroxydiphenylsulfone) and 4,4'-dihydroxydiphenyl-2,2-butane.

24. An antistatic molded or formed product obtained by molding or forming the nitrile resin composition according to claim 23.

25. A nitrile resin composition according to claim 18, wherein the ethylene oxide adduct of a bisphenol has a number average molecular weight of 1,600 to 3,000.

26. An antistatic molded or formed product obtained by molding or forming the nitrile resin composition according to claim 25.

27. An antistatic molded or formed product obtained by molding or forming the nitrile resin composition according to claim 18.

28. A nitrile resin composition according to claim 1, wherein the melt viscosity of polyether ester amide at 210° C. ranges from 300 to 1,500 Pa.sec at a shear rate of $10^2$ $sec^{-1}$ and 150 to 400 Pa.sec at a shear rate of $10^3$ $sec^{-1}$.

29. An antistatic molded or formed product obtained by molding or forming the nitrile resin composition according to claim 28.

* * * * *

UNITED STATES PATENT AND TRADEMARK OFFICE

CERTIFICATE OF CORRECTION

PATENT NO. : 6,084,028

DATED : July 4, 2000

INVENTOR(S) : Makoto SOMEDA et al.

It is certified that error appears in the above-identified patent and that said Letters Patent is hereby corrected as shown below:

On the first page of the patent, Section [57], last line, change "0.2" to --0.02--.

Column 20, line 64, change "3.0" to --30--.

Signed and Sealed this

Eighth Day of May, 2001

*Attest:*

NICHOLAS P. GODICI

*Attesting Officer*

*Acting Director of the United States Patent and Trademark Office*